Figure 1:
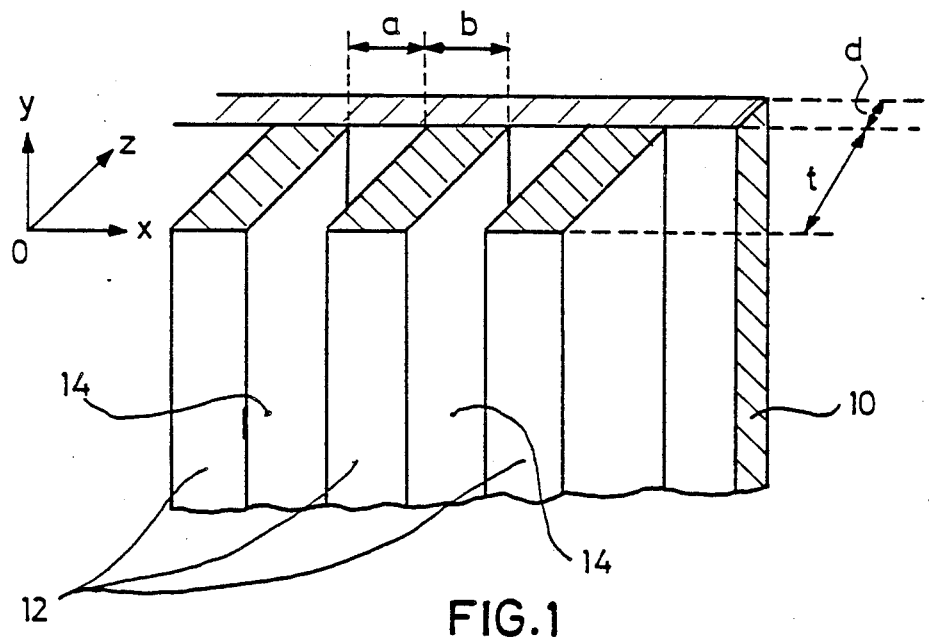

United States Patent [19]

Keilmann

[11] Patent Number: 4,927,236
[45] Date of Patent: May 22, 1990

[54] NON-SELF SUPPORTING OPTICAL DEVICE WITH SUPPORT STRUCTURE

[75] Inventor: Fritz Keilmann, Stuttgart, Fed. Rep. of Germany

[73] Assignee: Max Planck-Gesellschaft zur Foerderung der Wissenschaften e.V., Fed. Rep. of Germany

[21] Appl. No.: 166,221

[22] Filed: Mar. 10, 1988

[30] Foreign Application Priority Data

Mar. 12, 1987 [DE] Fed. Rep. of Germany ....... 3707983

[51] Int. Cl.$^5$ .............................................. G02B 5/30
[52] U.S. Cl. ................................ 350/276 R; 350/370
[58] Field of Search ........................... 350/276 R, 370

[56] References Cited

U.S. PATENT DOCUMENTS 4,289,381 9/1981 Garvin et al. ........................ 350/370

Primary Examiner—Bruce Y. Arnold
Assistant Examiner—Rebecca D. Gass
Attorney, Agent, or Firm—Handal & Morofsky

[57] ABSTRACT

An optical arrangement is described, which has an optically effective arrangement and a supporting structure therefor. The optically effective arrangement has such a slight thickness which alone is not sufficiently stable mechanically and which is designed for the transmission of optical radiation of a predetermined wavelength region. The supporting arrangement has a metallic planar structure with a plurality of apertures separated by webs. The width (a) of the apertures is larger than the half of the wave length and the sum (a+b) of the width of an aperture (14) and of an adjoining web (12) is smaller than the wave length. Such supporting arrangement transmits a vertically incident radiation without loss. Optical arrangement (10) mounted on the support structure can be, for example, an optically effective layer or a grid of parallel thin wires which rung perpendicularly with respect to the slot-like apertures of the supporting structure.

11 Claims, 1 Drawing Sheet

NON-SELF SUPPORTING OPTICAL DEVICE WITH SUPPORT STRUCTURE

The present invention relates to an optical arrangement consisting of an optically effective arrangement (i.e. the optically active component in the optical arrangement) of insufficient thickness to be mechanically stable and a supporting arrangement (i.e. supporting structure) that is substantially transparent (optically passive) to radiation transmitted through the optically active arrangement which the supporting structure is coupled to.

The known optical arrangements serving for the transmission of radiation in the visible and infrared spectral region, such as windows, filters, polarizers, beam splitters, modulators or detectors, generally possess a relatively large thickness which is measured in the beam radiation direction, which thickness is a multiple of the wavelength of the optical radiation in which the given optical device is designed to operate, which is either for the reasons of strength (such as in the case of windows, wire polarizers, parallel wire grids, etc.) or for reasons of the optical effects (such as in the case of lenses, double refractive polarizers, non-linear crystals, etc.).

The known optical arrangements possess a disadvantage due to the heavy material thickness, in that their weight is relatively large and then can be loaded only with a relatively small radiation load, since they become easily hot due to the unavoidable absorption and even at the slightest warming they cause undesirable distortions in the transmitted radiation beam.

Thin, non-self supporting or mechanically sensitive optical arrangements may not have the above-noted disadvantages, they require, however, a relatively thick transmitting supporting structure, such as a substrate plate made from a radiation transparent material, so that the above-noted problems will be transferred onto the supporting structure.

Accordingly it is an object of the present invention to provide an optical arrangement having an optically effective device, which has certain surface dimensions as well as a relatively small thickness, which alone would not be mechanically stable to a sufficient degree, and which is designed for the transmission of optical radiation in a given wave-length region, and which has a supporting structure which is substantially transparent for the radiation and which serves for the mechanical stabilizing of the optically effective device and is coupled thereto, and which is furthermore light, has a slight thickness and, consequently, can be loaded substantially higher than the known optical arrangements of the above described art in which the supporting structure comprises, for example, a glass plate or similar means.

The objective is achieved by using at least one group of spaced webs or lamellae as the supporting structure wherein the structure is dimensioned and spaced such that it is substantially transparent to the radiation transmitted through the optically active component.

Advantageous further developments and embodiments of the optical arrangement according to the present invention are the subject of the dependent claims.

The optical arrangement according to the present invention comprises an optically effective surface structure, in which the optical effect is attained with a minimum material thickness, also with a very slight weight. The absence of a heavy dielectric substrate has the further advantage, that the frequently unavoidable individual absorption of such substrate and the beam distortion and beam deflection associated with the non-homogeneous heating of the substrate will be avoided. Due to the slight thickness the optical arrangement according to the invention can also be effectively cooled by a blower, or by a similar device. The coupling with further elements, possibly with a second similar optical arrangement, can be realized, through space-saving components, such as variable phase shifter, dampers, compensators for elyptic polarization, rotators for the linear polarization or insulators. The angle of incidence can be optimally realized in the case of several optical arrangements set up serially behind each other in the beam path, so that even in a compact structural arrangement no disturbing or multiple reflecting beams will result, and furthermore the reflected beam can be trapped by an absorbing or water cooled housing.

Figure 2:
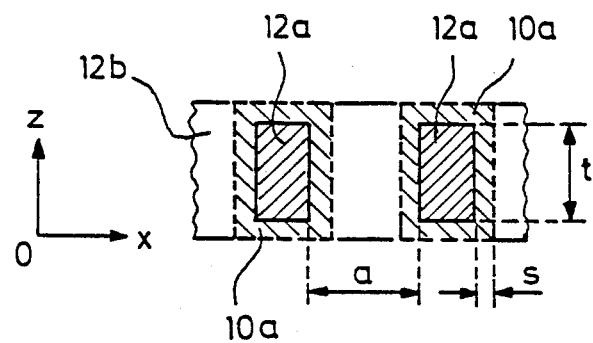
Figure 3:
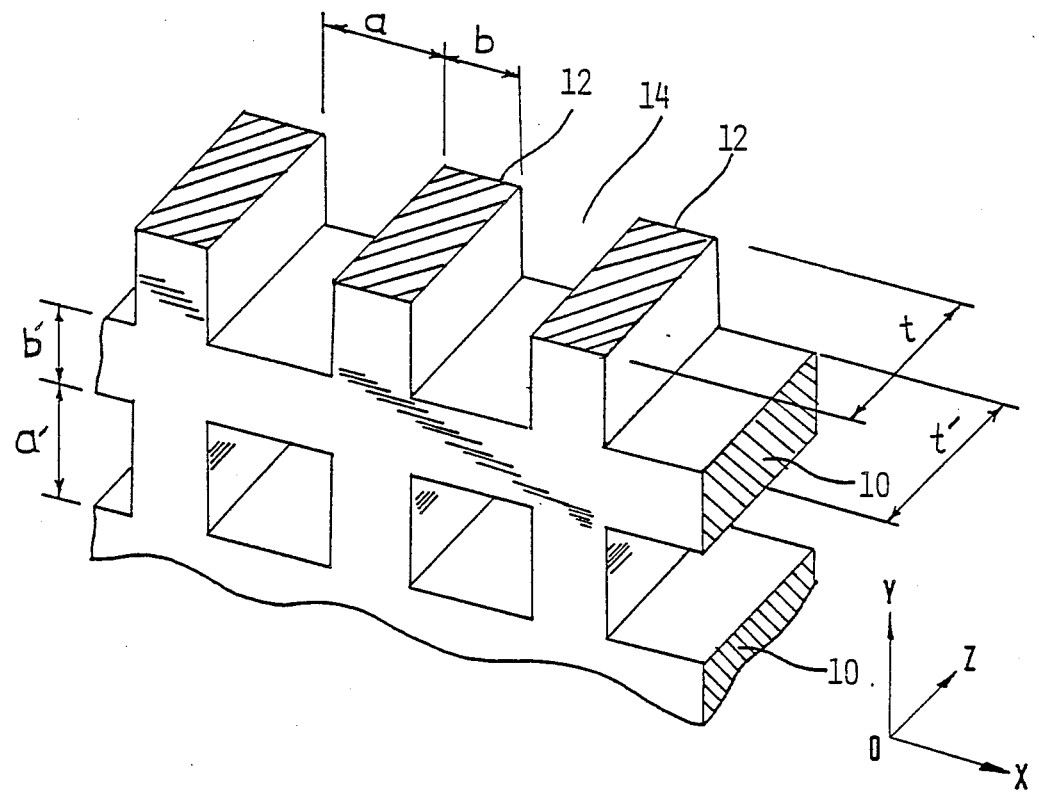

In the following, embodiments of the invention will be described in more detail with reference to the drawings, in which:

FIG. 1 illustrates a substantially enlarged, somewhat schematic sectional view of an embodiment of the present optical arrangement, FIG. 2 is a substantially enlarged sectional view of a second embodiment according to the invention, and FIG. 3 illustrates a substantially enlarged, somewhat schematic sectional view of another embodiment of the optical arrangement.

The optical arrangement illustrated in FIG. 1 has an optically effective device (10) which, for example, is illustrated as a thin layer which, for example, may consist of a semiconductive or dielectric material and is homogeneous. The optically effective arrangement (10) has certain planar dimensions, that is, a certain width (x) and a certain height (y) which can be selected within a certain range and, for example, can have a magnitude expressed in centimeters or in decimeters. The optical arrangement has, however, a thickness (d) which is counted in the z-direction, which is so small, that the arrangement alone mechanically would not be sufficiently stable. The optical device (10) is, for the transmission of optical radiation, defined in a certain wave length region.

The flat, optically effective device (10) is for the mechanical stabilizing or stiffening thereof coupled with a supporting arrangement, which according to the invention, comprises strips, webs or lamellae (12), which in the illustrated embodiment are arranged parallel with respect to each other, with spacing (a) and have a width (b) and a thickness (t). The direction of the thickness corresponds to the direction of expansion of the radiation, which falls perpendicularly onto the main surface of the arrangement (10) formed by a layer. It is not necessary that the supporting structure consisting of the lamellae (12) and the optical device (10) be arranged in an abutting relationship with each other. Both structures can penetrate each other to a desired extent.

The spacing (a) between adjacent metallic lamellae (12) according to the present invention will always be larger than half of the maximum wave length (the upper wavelength limit) of the wavelength region in which the optical arrangement is operated. The optical radiation having a wavelength which is smaller than the above-mentioned upper wavelength limit and which falls perpendicularly, that is, in the z-direction onto the lamellae-supporting structure extending in the xy-plane, will, independently of its polarization direction with reference to the longitudinal direction of the lamellae, pass through practically loss-free through the spacings (14) between the lamellae. In order to avoid any diffraction effects, at a beam incidence in the z-direction, additionally the sum of the lamellae width (b) and the lamellae spacing (a) will be selected smaller than the lower wave length limit of the operating beam. In case of a slant incidence of the beam, the relationship $(a+b)(1-\sin a) < \lambda$ holds. The thickness (t) of the supporting structure, that is, of the lamellae, will in general be about one wave length, it can be, however, somewhat smaller, if the stiffness of the structure permits it, or it can be of a magnitude amounting to a few wave lengths.

For a beam in the visible and in the infrared spectral region, for example, up to 200 micrometers, (a) will be preferably made equal to (b), whereby the supporting structure consisting of the lamellae (12) will be mechanically and thermally most reliable.

A very important characteristic of the supporting structure comprising the parallel and spaced lamellae (12) resides in that a reflection of the perpendicularly incident beam has been eliminated. In order to attain this, the beam which is parallel to the longitudinal direction of the lamellae, should be polarized also in the y-direction and (a+b) must be selected to be equal $\lambda/f$, wherein f is a factor depending from a, b, t and, the profile form which should not necessarily be of the shown rectangular form, is in the magnitude of about 1.1 to 1.3. If we select f=1.2, then a resonantly transmitting supporting structure is created having about $a=0.6\lambda$ and $b=0.25\lambda$.

At wave length regions falling in the visible and the infrared spectral region, the above described lamellae-supporting structure alone is not stable mechanically and by being coupled with a optically effective arrangement (10) which itself is not self-supporting or not sufficiently stable, however, as a whole, a mechanically sufficiently stable optical arrangement can be created. It should be noted at this point, that the factor f can be somewhat changed by the addition of the optically effective arrangement (10).

The invention can be realized with various optically effective arrangements. In a first embodiment, the optically active arrangement comprises a further metallic structure, namely from thin wires extending in the x-direction, that is, transversely to the supporting lamellae (12). The wires can correspond regarding profile and periods with those of the supporting lamellae (12), therefore, one will obtain a cross-grid, the properties of which will not depend from the polarization of the passing beam. By dimensioning differently the wires forming the optically effective device (10), various other types of polarizing optical arrangements can be obtained. For example, the optically active arrangement may comprise from relatively tightly set up metallic lamellae, the spacing (a') of which is smaller than half of the upper wave length limit, whereby the periods and as well the sums of the spacings (a') and the widths (b') of the lamellae running perpendicularly to the lamellae (12) of the supporting structure of the optically effective arrangement should be smaller than the lower wave length limit as illustrated in FIG. 3. Such an optically effective arrangement appears to be non-passing for a beam which is polarized parallel with respect to the x-direction. By appropriately selecting a' and the thickness d' calculated in the z-direction, as well as the profile form of the optically effective lamellae structure, one may attain that a beam, the electrical Vector (E) of which is polarized parallel with respect to x, becomes fully reflected and the transmitted portion of such polarizing direction therefore will be as small as selected. The optical arrangement becomes therefore a linear polarizer having a very high polarization contrast. Such a polarizing arrangement can have additional advantages when combined with a conventional supporting structure, for example, one having a thick dielectric substrate.

In a second embodiment of the present optical arrangement the optically effective device (10) comprises a thin homogeneous layer made from metal, from a semi-conductor or from a dielectric material. Such arrangement can be used as a window. On the other hand, when the layer thickness d and the specific conductivity $\sigma$ of the layer material is selected such that $1/(\sigma d) \approx 100$ Ohm (Woltersdorff-condition), then one will attain a high beam absorption, such as one may be desirable for a detector or a modulator. In the case of a modulator, the conductivity of the layer forming device (10) can be modulated for the acoustic, electrical, magnetic or optical fields having influence thereon. The supporting lamellae (12) can be used for contacting the layer, and for example, may form a pair of electrode systems made from comb-like elements grabbing into each other. The slight thermal inertness of the thin layers make it possible to obtain a high modulation frequency and a high sensitivity regarding the control fields.

In a third embodiment of the present optical arrangement, which is illustrated in FIG. 2, the supporting arrangement comprises two groups of lamellae (12a, 12b) which preferably intersect each other at a right angle, and which form a metallic cross-grid. The optically active arrangement comprises a coating from a semi-conductive or dielectric material, that is deposited by growing or by vaporization or by a similar method onto the webs of the cross-grids. FIG. 2 illustrates a section running parallel with respect to the x-z plane by two lamellae or webs (12a) of the cross-grid, which extend in the y-direction. One may observe a further coating (10a) of the said webs which is made from a semi-conductive or dielectric material. In the event the thickness s of a coating (10a) made, for example, from a semi-conductive material is selected so that $(a-2-s)<\lambda/2$, but $a>\lambda/2$ is, then by increasing the load carrying thickness of the semi-conductive layer, one may select the transmission of the optical arrangement to be switched from fully transmitting to fully reflecting. Such switching can be accomplished very quickly by the heating up of the semi-conductive layer (10a) by short laser pulses, since expansion effects may have only a practically unnoticeable distortion due to the relatively short periods.

The above described supporting structures can be produced by various known methods. One may, for example, start with a thin metal foil and to produce therein by a photolithographic method or by a focussed beam (laser beam, electron beam, ion beam) slots or quadratic-like apertures, so that the remaining material will provide the necessary lamellae or webs. Another possibility resides in that the lamellae or webs are produced by vacuum deposition or by sputtering, where upon the structure formed in this manner could be reinforced by galvanization if necessary.

In a practical embodiment which is in the form of a linear polarizer designed for a wavelength of about 10.6

μm, for the lamellae (12) the following spacings and dimensions were given:

a=8 μm; b=2 μm, t=4 μm and the optically effective arrangement was in the form of a grid structure made from parallel rectangular metal webs, which are running perpendicularly with respect to the lamellae and had the following spacings and dimensions:
spacing a'=4 μm
width b'=2 μm
depth t'=4 μm The supporting structure as well as the polarizing grid structure were from gold. The supporting structure and the grid structure penetrated each other completely [similarly as shown in FIG. 2, in which only the grid webs would be indicated by the reference character (12b)], they could have been made only partially penetrating or lying adjacently, such as shown in FIG. 1.

Besides gold other metals can be used, preferably precious metals for the supporting structure and/or the optically effective arrangement, in as much as they are made from metal.

I claim:
1. An optical arrangement comprising
    an optically effective arrangement (10) which has predetermined planar dimensions as well as a slight thickness (d) which alone is not sufficiently stable mechanically and which is designed for the transmission of optical radiation of a predetermined wave length region, and
    supporting arrangement which is substantially transparent for the radiation and which is coupled with the optically effective arrangement for the mechanical stabilization thereof,
characterized in that
    the supporting arrangement comprises at least one group of spaced webs or lamellae (12) made from metal, the spacing (a) of which is larger than the half of the maximal wavelength of the predetermined wave length region and
    the lamellae (12) have a width (b) and such spacing (a) with respect to each other, that the sum (a+b) of a lamellae width and of a lamellae length is smaller than the smallest effective wavelength of the wavelength region, wherein in the case of a vertical beam incidence, the effective wave length is equal to the smallest wavelength of the wavelength region and, in case of a radiation incidence under an angle α (for example in the z-y plane) the effective wavelength is equal to the minimum wave length divided by (1-sin α).

2. The apparatus as claimed in claim 1, wherein the sum (a+b) of one lamella width (b) and of a lamella spacing (a) is equal to a nominal wavelength in the wavelength region divided by a factor having a magnitude of 1.1 to 1.3.

3. The apparatus as claimed in claim 2, wherein the lamella spacing (a) is about 0.6 × the nominal wavelength and the lamella width (b) is about 0.25× the nominal wavelength.

4. The apparatus as claimed in claim 1, wherein the supporting arrangement comprises two groups of parallel metallic lamellae crossing each other.

5. The apparatus as claimed in claim 4, wherein the lamellae of both groups have equal width and equal spacings.

6. The apparatus as claimed in claim 1 wherein the optically effective arrangement comprises a substantially homogeneous layer made from a semiconductive or dielectric material.

7. The apparatus as claimed in claim 1, wherein the optically effective arrangement comprises a layer (10a) consisting of a semi-conductive or dielectric material on the surface of the lamellae (12a).

8. The apparatus as claimed in claim 7, wherein the lamellae comprising the semi-conductive layer having a thickness such that the difference (a−2s) between the lamellae spacing (a) and the double thickness (2s) is smaller than one half of the nominal wavelength in the wavelength region.

9. The apparatus as claimed in claim 8, further comprising a device for increasing the charge carrier diffusion in the semi-conductive layer.

10. The apparatus as claimed in claim 1, wherein the optically effective arrangement comprises a parallel wire grid.

11. The apparatus as claimed in claim 1, wherein the optically effective arrangement comprises a group of parallel metallic lamellae, wherein the optically effective arrangement lamellae (10) cross the supporting structure and have such width (b') and such spacing (a') between each other, that the spacings (a') are smaller than the half of a nominal wave length of the wavelength region and the sum (a'+b') of one of said lamellae spacings and one of said lamellae widths is smaller than the nominal wavelength.

* * * * *